Nikolaus Laing
INVENTOR.

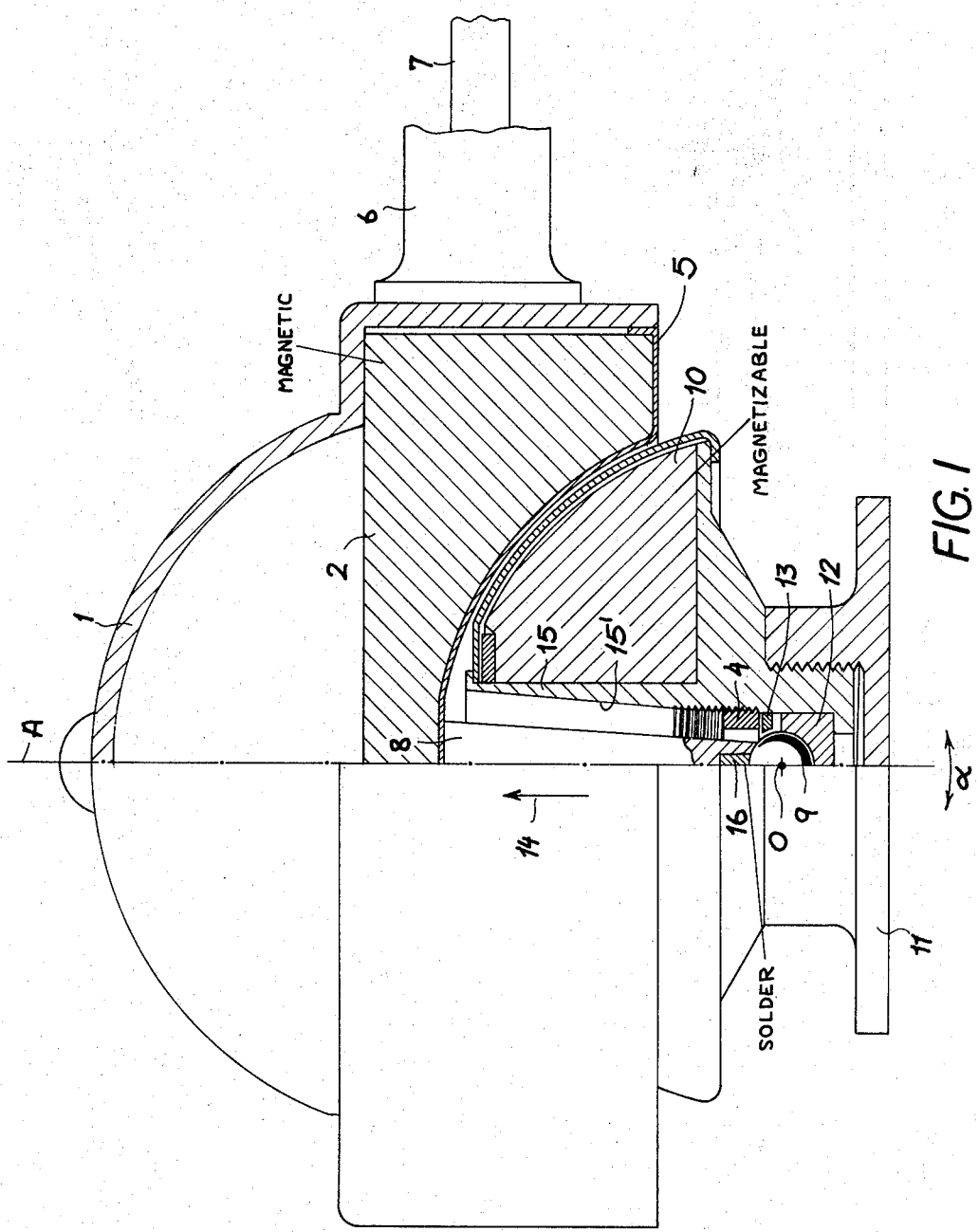

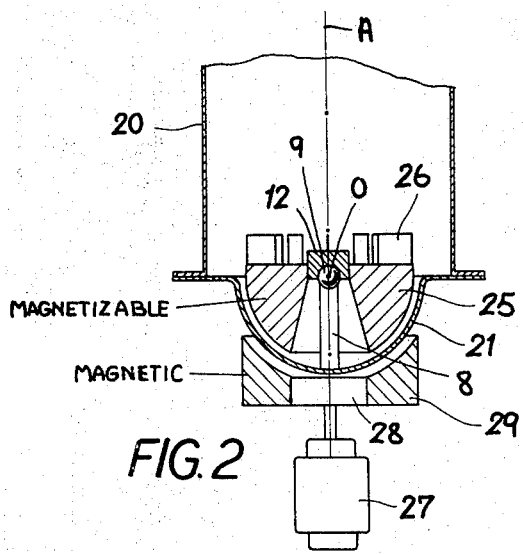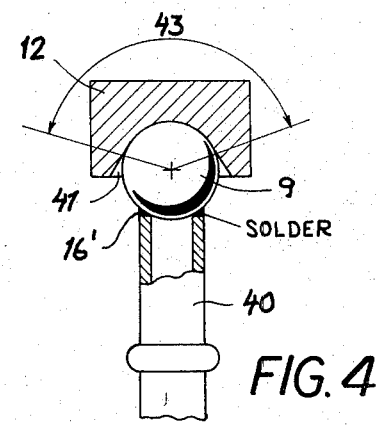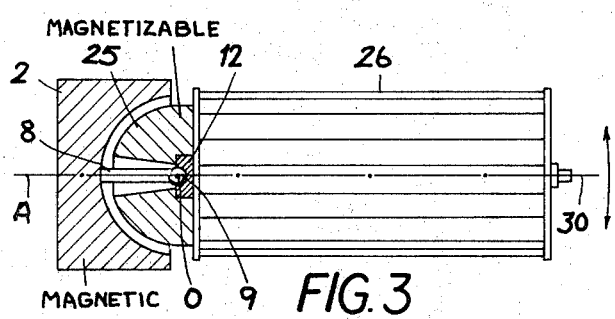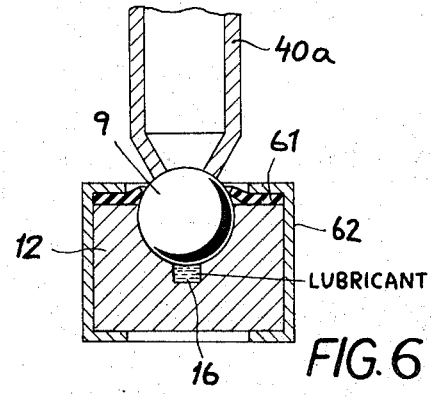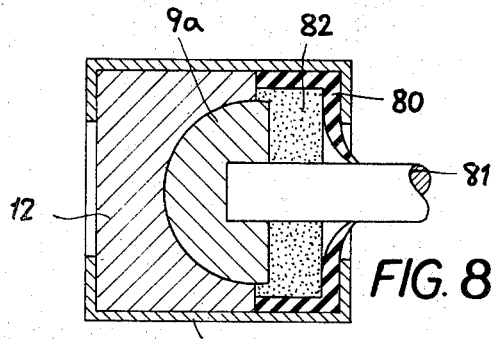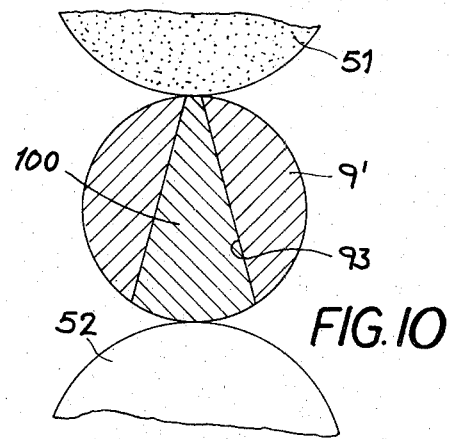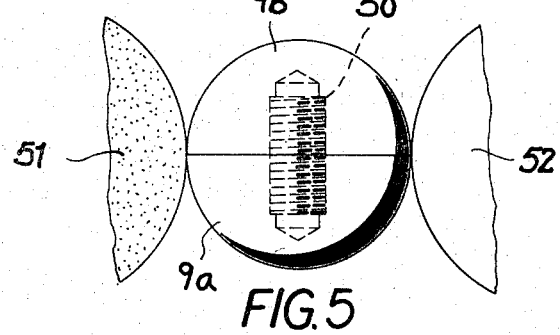

United States Patent Office 3,553,807
Patented Jan. 12, 1971

3,553,807
METHOD OF MAKING SPHERICAL BEARINGS
Nikolaus Laing, Hofener Weg 35–37, Aldingen,
near Stuttgart, Germany
Filed June 24, 1968, Ser. No. 744,247
Claims priority, application Germany, June 22, 1967,
1,575,377
Int. Cl. B23p *11/00*
U.S. Cl. 29—149.5                                17 Claims

ABSTRACT OF THE DISCLOSURE

A spherically curved ball and a complementary socket form two coacting bearing members connected, respectively, with a fixed support and with a rotatable body. By angularly displacing the spin axis of this body about the center of the sphere, the less perfectly spherical bearing surface is trued and made to conform to the other surface, e.g. that of the ball. The motion of the spin axis may be maintained, in use, by forcible wobbling or by automatic precession; this insures continued sphericity and allows the bearing to operate with little or no lubrication.

---

My present invention relates to a method of making spherical bearings for mounting a rotatable body on a support, e.g. in a magnetic torque-transmission device of the type disclosed in my copending application Ser. No. 685,931, now Pat. No. 3,438,328, dated Apr. 15, 1969, filed Nov. 27, 1967. Such a device may be used, for example, to drive the rotor of a blower or a pump by means of a magnetic coupling, the magnetic field of this coupling serving not only to entrain the rotor about its spin axis but also to maintain the two bearing members in mutual engagement. Reference in this connection may also be made to my U.S. Pat. No. 3,354,833 disclosing and claiming such a magnetic coupling.

As described in my aforementioned copending application, the use of complementary bearing members of spherical curvature allows the supported rotor body to deviate from precise axial alignment with its stator without detrimentally affecting the seating of the convex member or ball in the concave member or socket.

The general object of my present invention is to provide a method of producing two complementary bearing members of virtually precise spherical curavture in order to minimize wear, simplify the problem of lubrication, and allow for accidental or intentional disalignment of the axes of the driving and driven elements respectively con-nected with these bearing members.

A more particular object of my present invention is to provide a method of making a bearing resistant to attack by solid particles that may intrude between its relatively moving surfaces.

It is also an object of my invention to provide a method of so operating a machine of the character described as to increase the life span of its spherical bearing.

My invention is based upon the fact that the present state of the art of centerless grinding, e.g. as practiced for optical lenses, enables balls of spherical curvature to be made with almost perfect geometric accuracy on being ground between a pair of disks rotating about relatively offset axes. The term "ball," as used hereinafter, is intended to refer to any member whose principal outer surface is spherically convex, whether or not such convex surface defines a complete sphere.

In accordance with my present invention, I provide a ball member and a complementary socket member of substantially spherical initial curvature, the sphericity of one member being more perfect than that of the other. The more perfect member will generally be the ball, owing to the availability of the aforedescribed technique of centerless grinding. Since, however, my novel method results in the formation of virtually perfect spherical sockets, as will be more fully apparent hereinafter, the invention may also be practiced by starting with a more precisely spherical socket member.

The more perfect member, assumed to be the ball, is placed upon a support and inserted into the mating socket whose effective depth should not be greater than the ball radius. With the socket fastened to a rotating body, the latter is set in motion about a spin axis which passes through the center of the sphere, sufficient play being provided to allow for an angular displacement of the spin axis about this center by at least a few degrees. Then, during rotation of the rotatable body, the spin axis is angularly displaced in a random manner or at a constant rate unrelated to the angular velocity of the body. As a result of this displacement of the spin axis, the surface irregularities of the socket are progressively leveled so that, eventually, the two bearing surfaces precisely conform to each other.

According to another aspect of my invention, the angular displacement of the spin axis about the center of the bearing sphere is continued throughout the practical use of the coupling incorporating the present bearing. In this manner, the precision of fit is not only maintained but progressively improved during the useful life of the device. This continuing angular displacement may be brought about by a forcible wobbling of the rotor body, e.g. where the latter is used to drive a polishing disk or other implement to be placed in contact with irregularly shaped extraneous objects. It is also possible, however, to achieve this result by virtue of the precession which a body rotating about an inclined spin axis experiences if its center of gravity does not coincide with its point of support, i.e. with the center of curvature of the bearing surfaces.

Lest the truing of the less perfect bearing surface be impeded by extrinsic stresses, I prefer to give the two bearing members freedom of at least limited relative axial movement against a restraining force which may be that of gravity and/or a component of the aforementioned magnetic field. If the bearing members consist at least on their surfaces of a very hard material, such as tungsten carbide, hard chrome or sintered ruby, any solid particles intruding between these surfaces will be ground to dust and eventually ejected from the gap without seriously augmenting the frictional resistance of the bearing. The relative yieldability of the members prevents these particles from imbedding themselves in their surface so that the lifespan of the bearing is not materially shortened by such contamination.

If the device is to be used in an environment in which contamination by abrasive particles is not to be expected, the second bearing member (e.g. the socket) may be made of softer material than the first one to shorten the running-in period.

The specific bearing pressure that can be sustained by two relatively rotating members separated by a film of lubricant is directly proportional to the viscosity of the lubricant, the relative velocity of the surfaces and the length of the intervening gap; it is inversely proportional to the square of the average gap width. Thus, if the separation of the surfaces is extremely minute and the speed of rotation is sufficiently high, conventional lubricants may be dispensed with and air may be used in their stead; see, for example, U.S. Pat. No. 2,879,111. The high-precision machining according to my present invention allows the two surfaces to be so closely spaced as to facilitate air lubrication in the case of lightly loaded rotors. If the load is too heavy or the speed too slow, a liquid lubricant may be introduced into the gap by a continuous or intermittent moistening of the ball surface with the fluid. Various expedients, described in detail hereinafter, can be used to maintain an adequate supply of lubricant under these circumstances.

If the convex surface of the ball is less than a complete sphere, the initial shaping of the surface by centerless grinding can be simplified by temporarily complementing the ball to a sphere, the complementary portion or portions being subsequently removed. Thus, for example, a hemispherical ball may be paired with a similar ball during the shaping stage to produce, upon subsequent separation, two accurately machined male bearing members.

The above and other features of my invention will be described in greater detail hereinafter with reference to the accompanying drawing in which:

FIG. 1 is a side-elevational view, partly in section, of a portable polishing device embodying a bearing made in accordance with the invention;

FIG. 2 is a sectional elevational view of blender representing another embodiment;

FIG. 3 is a view similar to FIG. 2, illustrating a tangential blower embodying the invention;

FIG. 4 is an axial sectional view of a bearing according to the invention drawn to a larger scale;

FIG. 5 shows two hemispherical balls jointly subjected to centerless grinding in an initial stage of the method according to this invention;

FIG. 6 is a view similar to FIG. 4, showing a modification;

FIG. 8 is a view similar to FIG. 6, showing a bearing with a male member of the type illustrated in FIG. 5;

FIG. 10 illustrates, in axial section, another ball member in the process of shaping;

Figure 16:
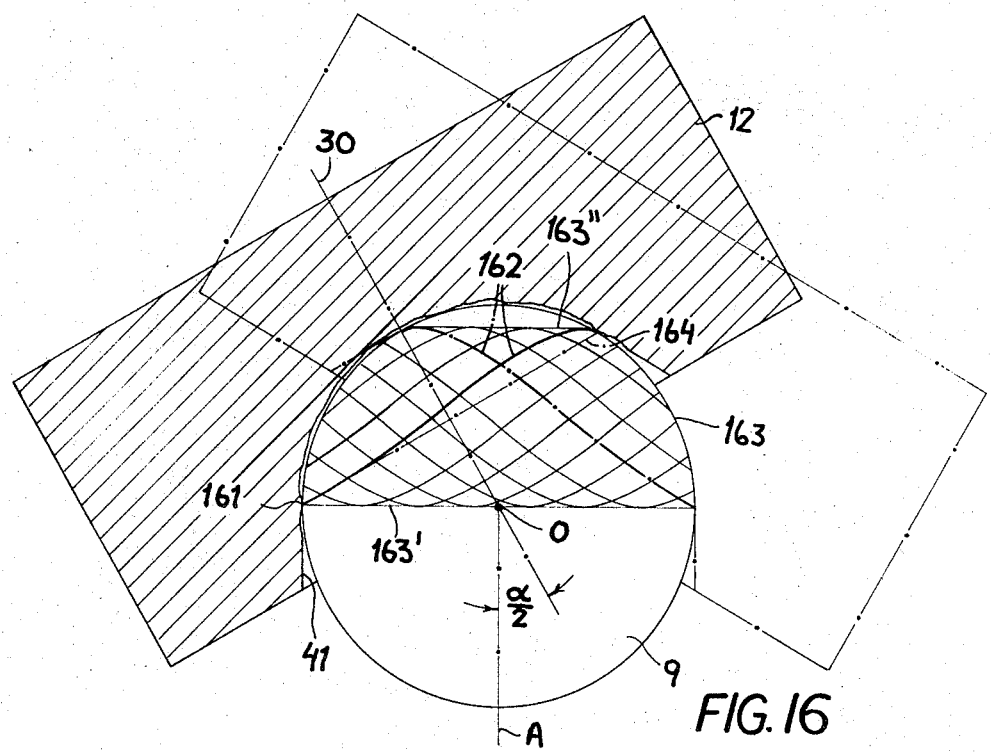
FIG. 16 is a somewhat diagrammatic view of a spherical bearing, serving to explain the principles underlying my present invention.

In FIG. 1 I have shown a polishing device, e.g. for automobile bodies, wherein a housing 1 contains the stator 2 of a magnetic coupling of the type disclosed in my aforementioned U.S. Pat. No. 3,354,833. This stator is energizable via a cable 7 in a handle 6 to generate a rotating magnetic field centered on the vertical axis A of housing 1. A curved partition 5 of nonmagnetic material separates the magnetic stator 2 from a magnetizable armature 10 which is rigid with a rotor body 15 having an axial bore 15′. Into this bore extends a stud 8 projecting outwardly from partition 5, the stud having a spherical metal ball 9 secured to it by solder 16. Rotor 15 carries a polishing disk 11 and is swivelably journaled on ball 9 by a complementary socket 12 press-fitted into its bore 15′. The rotatable assembly 10–12, 15 is free to swing in any direction about the center O of ball 9, within a limited angular range α determined by the clearance of stud 8 within bore 15′. Stator 2, when energized, exerts an axial force 14 upon the armature 10 so as to hold the socket 12 securely against the ball 9 even if disk 11 carries a wet grinding agent introducing a certain adhesion to the workpiece to be polished; a retaining ring 13, also press-fitted into bore 15′, embraces the upper half of ball 9 with play and merely prevents a detachment of the rotor upon demagnetization of stator 2. Retaining ring 13 is overlain by a guard ring 4 screwed into the threaded portion of bore 15′.

Ball member 9, which may consist of a highly refractory metal, is shaped to provide sphericity by the conventional centerless-grinding process referred to above. The concavity of socket member 12 has the same radius as ball 9 but is less precisely machined; in use, with the rotating disk 11 assuming various angles within its oscillatory range α, the socket surface is soon polished to a high degree of precision in conformity with the curvature of ball 9. An abrasive paste, e.g. of molybdenum disulfide and boron carbide, may be initially introduced into the socket 12 to assist in the truing of its surface during the running-in period. Thereafter, no treatment agent or lubricant is required for the bearing 9, 12.

The ball 9, if made for example of a metal carbide, may be soldered onto stud 8 by the blob 16 in an inert atmosphere as is well known per se.

In FIG. 2 I have shown another device in which a rotor is oscillatable about the center O of a bearing 9, 12 of the character just described, namely a blender comprising a mixing vessel 20 whose recessed bottom 21 accommodates a magnetic rotor 25 rigid with socket 12. Rotor 25 has a set of peripheral vanes 26 extending upwardly into the vessel. Stud 8, secured to ball 9 in the aforedescribed manner, is carried on the vessel bottom which is of nonmagnetic material and separates the armature 25 from an associated permanently magnetic drive ring 29 which is fitted onto a disk 28 driven by a motor 27.

The assembly of FIG. 3 includes a stator 2 of the type illustrated in FIG. 1, the associated housing and other elements having been omitted in this view. The socket 12 engaging the ball 9, which in turn is soldered onto the pin 8 extending from stator 2, is rigid with a magnetizable (or magnetic) armature 25 secured to a tangential blower 26. Blower axis 30, shown aligned with stator axis A, is again oscillatable about the center O of ball 9 within an angular range α determined by the clearance around pin 8. Means (such as the guard ring 13 of FIG. 1) for preventing a complete separation of the armature and blower 25, 26 from the stator 2 may, of course, be provided. Also, if desired, the fixed stator 2 may be replaced by a motor-driven magnetic ring as illustrated at 27–29 in FIG. 2.

Contrary to the polishing device of FIG. 1, wherein the disalignment of the stator and rotor axis is brought about by pressure exerted upon the working surface of disk 11 during use, the devices of FIGS. 2 and 3 operate by gravity-induced precession which in FIG. 2 is due to a fortuitous initial inclination of the rotor axis with reference to the vertical axis A of the vessel and in FIG. 3 results from the downward inclination of axis 30, with reference to its illustrated horizontal position, at the instant of starting. The effect of this precessional movement upon the coacting bearing surfaces of ball 9 and socket 12 will now be described with reference to FIG. 16.

Let it be assumed that the concave surface of socket 12 is initially so rough as to make contact with the (ideally) perfectly sperical outer surface of ball 9 on only three points, one such point having been designated 161 in FIG. 16. The axis 30 of socket 12 includes an angle α/2 of about 30° with the vertical stator axis A. If there were no precession, i.e. if the center of gravity of socket 12 and its associated rotor structure coincided with the center O of the sphere, point 161 would move along a latitudinal circle 164 in a plane perpendicular to axis 30. With the center of gravity located below the level of O (as in FIG. 2), the circle 164 is changed into a sinusoidal space curve 162; as long as the rate of precession is harmonically unrelated to the spin velocity about axis 30 (as will generally be the case), the peaks of curve 162 will progressively shift along the boundaries 163′, 163″ of a spherical zone 163 which is thus closely swept by the singular point 161. By this action the point 161 is gradually worn down and broadened to an ever-increasing region of precisely spherical curvature conforming to that of the segment 163 of ball 9. With the other points of contact experiencing a similar truing effect, the inner surface of socket 12 soon acquires its desired ultimate shape. As no deformation-generating forces come into play during the continuing operation of the precessing assembly, the coacting surfaces will tend to preserve their sphericity for an indefinite period.

FIG. 16 also illustrates a frustoconical bevel 41 at the mouth of socket 12 to facilitate the introduction of ball 9 into that socket. This bevel has also been shown in FIG. 4 wherein there has been indicated an arc 43 representing a spherical zone which extends over less than 180° and whose depth, therefore, is smaller than the radius of ball 9. In FIG. 4 this ball has been fastened to a tubular stud 40 by means of solder 16'.

In FIG. 5 I have shown a sphere composed of two halves 9a, 9b which are temporarily held together by a threaded pin 50, the sphere 9a, 9b being trued between a grinding wheel 51 and a guide wheel 52 which are rotatable about noncoincident axes and can be relatively oscillated on opposite sides of their common plane. In accordance with the conventional technique of centerless grinding, wheel 51 has an abrasive surface in contact with the workpiece 9a, 9b while wheel 52 has an adhering surface serving to change the orientation of the workpiece.

FIG. 6 illustrates the possibility of continually lubricating the interface between bearing members 9 and 12 with the aid of a suitable fluid stored in a recess 16 of socket 12. The ball 9, secured to a hollow stud 40a (e.g. by solder as described in connection with FIG. 4), is embraced without substantial pressure by an upturned peripheral lip of a resilient packing disk 61 which is mounted on socket 12 with the aid of a sheet-metal shell 62 having bent-over edges. Disk 61, apart from minimizing the loss of lubricant, prevents a complete detachment of ball 9 from socket 12 upon the disappearance of a normally effective restraining force (here gravity), as when the assembly of FIG. 6 is inverted.

Figure 7:
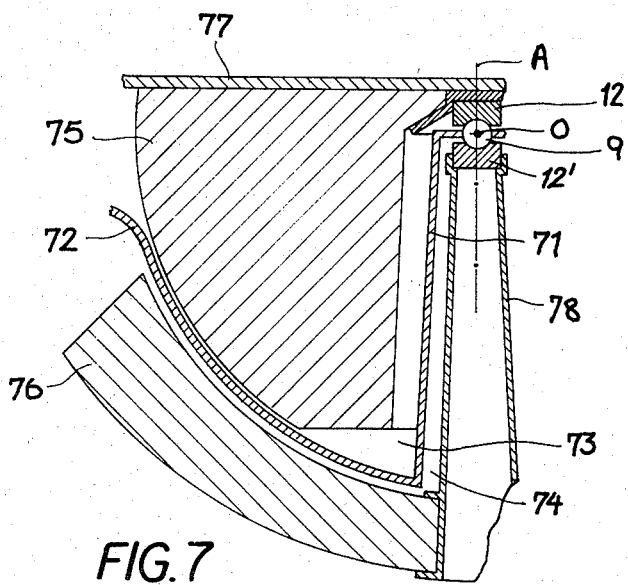
FIG. 7 is a fragmentary sectional view of another coupling incorporating a bearing according to the invention.

In FIG. 7 I have shown the ball 9 in contact with a first socket 12, supporting a rotor assembly 77 in essentially the same manner as shown in FIG. 1, and with a substantially identical socket 12' on which the ball 9 is cradled for free relative rotation. A tubular partition 71 in equatorial engagement with ball 9 separates the two spaces 73 and 74 surrounding the upper and lower halves of the ball and is integral with a nonmagnetic curved parting wall 72 interposed between two magnetically coupled armatures 75 and 76. Armature 75 is fixedly mounted on rotor 77 whereas armature 76 is rigid with a tubular stem 78 fixed to socket 12'. In this embodiment, the two rotor assemblies 75, 77 and 76, 78 may turn at different speeds and swing or precess at different rates about the vertical axis A passing through center O. The partition 71, 72, fixedly centered on that axis and rigid with ball 9, enables the use of different working fluids in spaces 73 and 74, e.g. water or steam in space 74 for driving a turbine (not shown) mechanically connected with magnetic rotor 76 and a nonaqueous solution in space 73 to be pumped by vanes (not illustrated) on rotor 77. In light of the principles discussed above, the active surfaces of both sockets 12, 12' are polished and trued to conform to the upper and lower halves of the sphere 9.

FIG. 8 illustrates an arrangement generally similar to that of FIG. 6, with the exception that sphere 9 has been replaced by a hemispherical ball 9a produced by the process illustrated in FIG. 5 and described above. Again, an insert 80 of elastic packing material surrounds the male bearing member and is held in position by a sheet-metal enclosure 83. The outwardly bent lip of insert 80 engages a stem 81 projecting from the flat side of ball 9a; the slight centering effect exerted by this insert is overriden, however, by the forcibly induced or gravity-caused wobbling or precession stresses previously described. A space 82 within insert 80 may be filled with a lubricant, preferably one of solid character.

Figure 9:
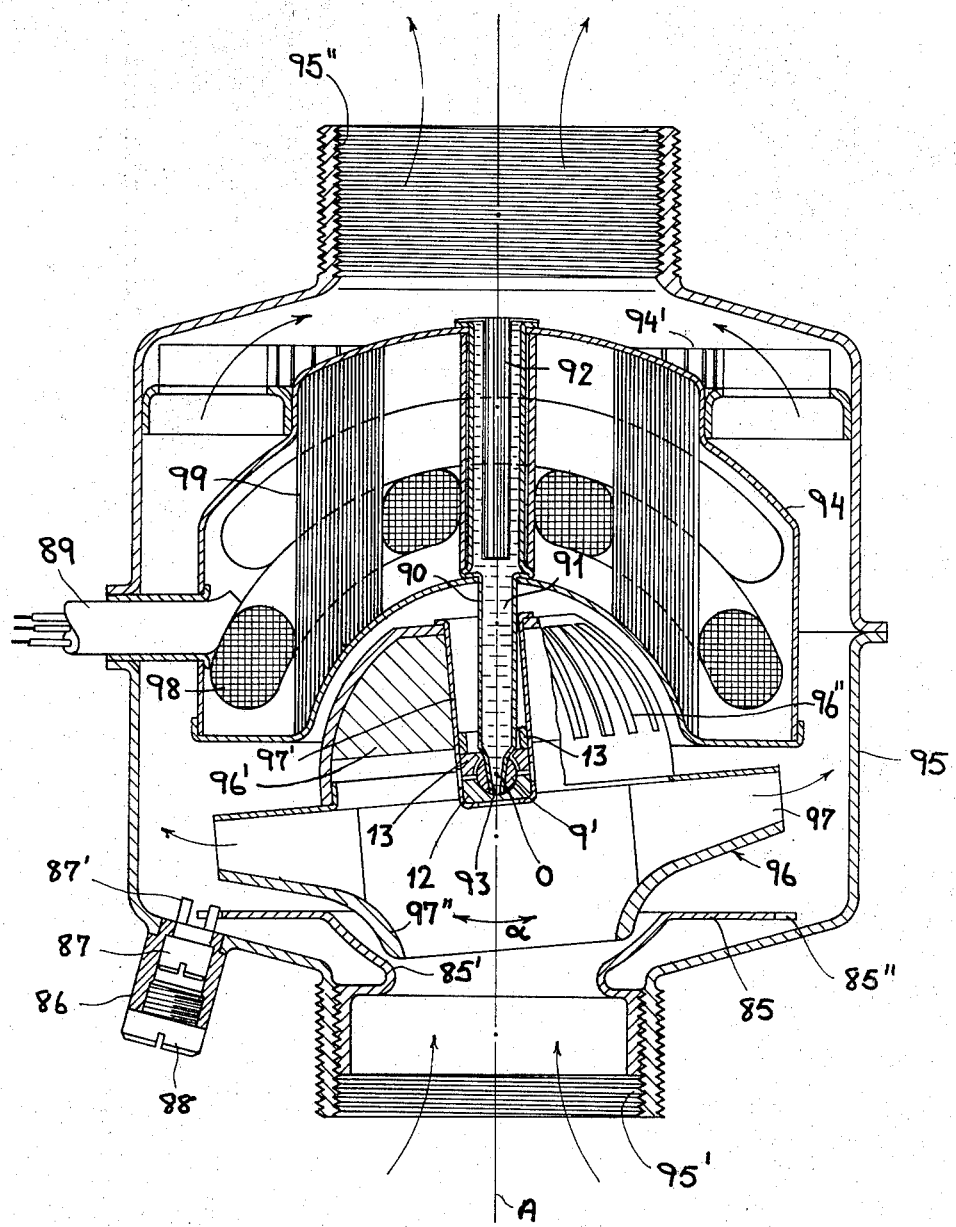
FIG. 9 is an axial sectional view of a pump with a bearing according to the invention.

In FIG. 9 I have shown a ball 9' which differs from the previously described male bearing members in being provided with a throughgoing axial channel 93 of frustoconical shape. A packing gland 90 filled with lubricant 91 intrudes from above into the channel 93 and is secured at the top to a stator enclosure 94 mounted by an apertured ring 94' in a pump housing 95. The upper end of gland 90 is sealed by a flexible membrane 92, e.g. a radially pleated metal foil.

The stator within enclosure 94 consists of a laminated body 99 of ferromagnetic sheet material in the form of a coiled strip, the body being provided with cutouts to accommodate energizing windings 98 which receive their operating current from a cable 89. The associated rotor 96 has a ferromagnetic armature 96' (e.g. of sintered iron) held in a conductive cage 96" of copper sheet. The lower part of the rotor is annular and formed with a peripheral array of generally radial impeller vanes 97 to drive air or some other working fluid from an intake port 95' of housing 95 to a discharge port 95". Membrane 92 turns a concave side toward this discharge port so as to be subjected to its relatively high ambient pressure. The swivel connection between rotor 96 and ball 9' is similar to that illustrated in FIG. 1 and includes a socket 12, a retaining ring 13 and a guard ring 4 mounted within an upwardly open thimble 97'; the annular clearance between socket 12 and ring 13 communicates with the low-pressure port 95' so that the pressure differential is effective to drive lubricant 91 from gland 90 into the bearing gap between ball 9' and socket 12.

A disk 85, closely spaced from the bottom flange 97" of rotor 96, substantially obstructs the fluid path around the rotor and is threadedly received in the neck 95' forming the intake port of the pump housing. A throat portion 85' of this disk is spherically curved about the center of curvature O about which the rotor is freely swingable within its angular range α. Peripheral teeth 85" on disk 85 mesh with a cogwheel formed by two pins 87' on a bolt 87 which is rotatable in a nipple 86 and is normally obstructed by a threaded plug 88; upon removal of this plug, bolt 87 can be turned by a screwdriver to rotate the disk 85, thereby adjusting the width of the bypass path between throat 85' and rotor 96 independently of the angular position of the latter.

As the pump is placed in operation, the initial impact causes its rotor 96 to assume an inclined position by an angle which may vary from a few degrees to the outer limit of the range α as determined by the physical dimensions of the rotor mounting. The greater this angle, the more effective will be the truing action as the rotor assembly precesses about the axis A of housing 95. If desired, the initial inclination may be insured by mechanical guide means, such as an eccentric opening at the top of thimble 97' confining the stem of gland 90.

FIG. 10 illustrates how the channeled ball 9' in FIG. 9 may be machined by the grinding technique described in connection with FIG. 5. Channel 93 is shown filled with a temporary plug 100 which should have the same hardness as the ball and is preferably made of the same material; after the shaping operation has been performed, the plug 100 is driven out of the bore 93 whereupon the ball 9' can be used in the system of FIG. 9.

Figure 11:
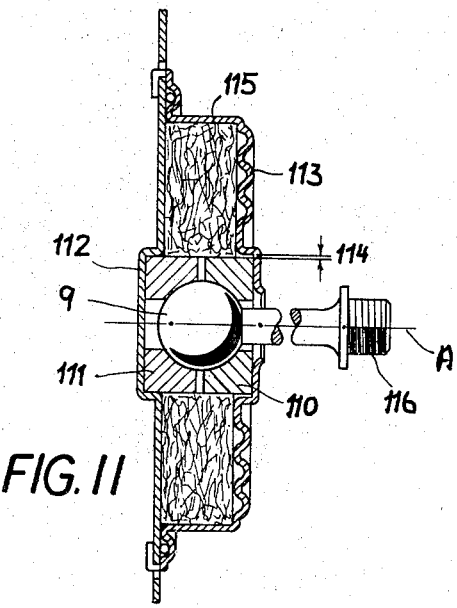
FIGS. 11–13 are cross-sectional detail views of further modifications.

In FIG. 11 I have shown a ball 9 journaled in two axially spaced, independently movable sockets 110 and 111 similar to the aforedescribed sockets 12 and 12'. A backing plate 12 and an elastic corrugated membrane 113 together define an enclosure which axially compresses the sockets 110 and 111 against the ball 9. Socket 110 is received in membrane 113 with a slight annular clearance 114 allowing a certain disalignment of the two socket axes so that their concavities adapt themselves solely to the outer surface of ball 9. The latter is again held (e.g. by solder) on a mounting stud here designated 116, this stud having a threaded extremity by which it may be screwed into a support not shown. An insert 115, e.g. of felt, is permeated with liquid lubricant (e.g. oil) and is compressed between backing plate 112 and membrane 113 so as to deliver the liquid to the gap between sockets 110 and 111. Apart from the limited relative mobility of the two sockets, the entire assembly 110–115 is free to rock or precess as a unit about the axis A of ball 9 and stem 116.

Figure 12:
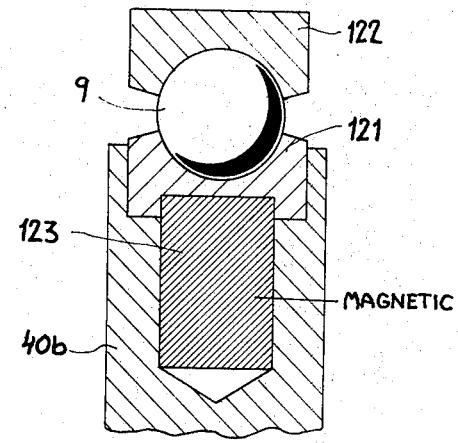

FIG. 12 shows an assembly generally similar to that of FIGS. 7 and 11, with ball 9 bracketed between two independently movable sockets 121 and 122. A mounting stud 40b is soldered or otherwise secured to the lower socket 121 in which the ball 9 is cradled, this ball being here made of a magnetically permeable material (e.g. tungsten carbide alloyed with cobalt) and being attracted onto its seat 121 by a bar magnet 123 inserted into the support 40b. Ball 9 may thus rotate on its seat independently of socket 122, or together with the latter if soldered or otherwise fastened thereto. This relative rotatability may be utilized for lubrication purposes as described below.

Figure 13:
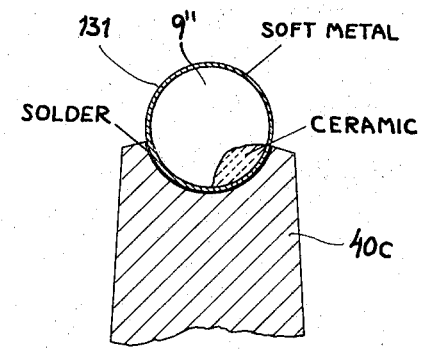

In FIG. 13 I have shown a ball 9'' made of ceramic material (e.g. sintered ruby) which is machined to precise sphericity before being coated with a very thin layer 131 of soft metal. This layer enables the ball 9'' to be soldered to a supporting stud 40c, the upper part of layer 131 being rapidly worn off on being brought into contact with a socket not shown.

Figure 14:
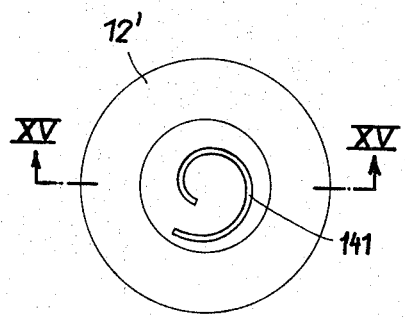
FIG. 14 is a plan view of a seat for a ball member in a bearing according to the invention.
Figure 15:
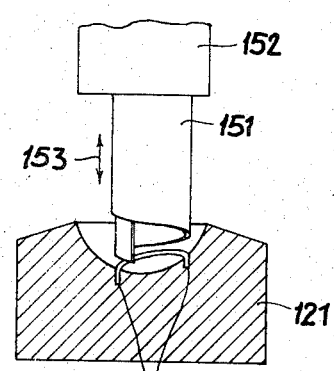
FIG. 15 is a sectional elevational view of the seat-forming element of FIG. 14, taken on the line XV—XV of the latter figure and showing a process for machining a lubricating recess in that seat.

In FIG. 14 I show the socket 121 of FIG. 12 formed with a bottom groove 141 of spiral configuration, serving as a reservoir for a lubricant which is picked up by the ball upon its rotation relative to the socket. As illustrated in FIG. 15, the groove 141 may be machined by the use of a supersonic vibrator 152 axially oscillating a stem 151 as illustrated by an arrow 153, the free end of the stem having a spiral cutting edge conforming to the groove. The use of such a vibrator allows the groove 141 to be produced without marring the spherical surface of the socket concavity.

Naturally, the various features described and illustrated with reference to different figures may be interchanged or combined, within the limits of compatibility, and may be further modified in a manner apparent to persons skilled in the art without departing from the spirit and scope of my invention as defined in the appended claims.

I claim:

1. A method of making a spherical bearing, comprising the steps of shaping the surface of a first bearing member to precise sphericity, fitting a less accurately spherical complementary second bearing member onto said first bearing member, attaching one of said bearing members to a support, securing the other said bearing member to a rotatable body, rotating said body relative to said support about a spin axis which passes through the center of curvature of said bearing member mounted on said support, and truing the surface of the bearing member mounted on the rotatable body by angularly displacing said spin axis about said center during rotation of said body.

2. A method as defined in claim 1 wherein said spin axis is displaced by forcible wobbling.

3. A method as defined in claim 1 wherein said spin axis is displaced by disaligning same from the vertical and letting it precess by the action of gravity upon said body, the latter having a center of gravity offset from said center of curvature.

4. A method as defined in claim 1 wherein said first bearing member is a ball and the surface thereof is shaped by centerless grinding.

5. A method as defined in claim 4 wherein said ball is less than a complete sphere, further comprising the step of complementing said ball to a sphere before subjecting same to centerless grinding and thereafter removing the complementary portion.

6. A method as defined in claim 5 wherein said ball is hemispherical, the complementary portion being an identical second ball.

7. A method as defined in claim 4 wherein the surface of said ball is moistened with lubricant during rotation of said body.

8. A method as defined in claim 7 wherein the rotation of said body is utilized to produce pressure upon a working fluid, the lubricant being subjected to the pressure of said working fluid whereby it is injected between said members.

9. A method as defined in claim 7 wherein the lubricant is stored in an absorbent mass disposed under substantially constant pressure about said bearing members.

10. A method as defined in claim 7 wherein said first bearing member is a spherical ball rotatably cradled on said support, the lubricant being introduced between the support and the ball surface.

11. A method as defined in claim 10 wherein said ball is held onto said support by magnetic attraction.

12. A method as defined in claim 1 wherein said members are held in mutual engagement by a generally axial restraining force with freedom of at least limited axial separation.

13. A method as defined in claim 1 wherein said second bearing member is made of a material softer than that of said first bearing member.

14. A method as defined in claim 13 wherein an abrasive is introduced between said bearing members in an initial running-in stage.

15. A method as defined in claim 1 wherein said first bearing member is made of a ceramic material and is initially coated with a thin metal layer for soldering to said support, said layer being worn off by contact with said second bearing member during rotation of said body.

16. A method of operating a machine having two relatively rotatable elements, a first bearing member of spherical curvature secured to one of said elements, a complementary second bearing member of like curvature engaged by said first bearing member and secured to the other of said elements, and drive means for rotating said other of said elements about a spin axis passing through the center of curvature of said bearing members, said method comprising the step of continuously displacing said spin axis about said center during rotation of said other of said elements.

17. A method of making a spherical bearing, comprising the steps of shaping the surface of a ball member to precise sphericity, fitting less accurately spherical complementary first and second socket members onto said ball member, attaching said first socket member to a support, securing said second socket member to a rotatable body, rotating said body relative to said support about a spin axis which passes through the center of curvature of said ball, and truing the surface of the socket members by angularly displacing said spin axis about said center during rotation of said rotatable body.

References Cited
UNITED STATES PATENTS 3,205,027  9/1965  Hilton _____ 29—149.5B
3,251,117  5/1966  Maynard et al. _____ 29—148.4L THOMAS H. EAGER, Primary Examiner U.S. Cl. X.R.

29—441